June 2, 1936.  N. S. BESTOSO  2,043,147
PRONY BRAKE
Filed Jan. 10, 1936  2 Sheets-Sheet 2
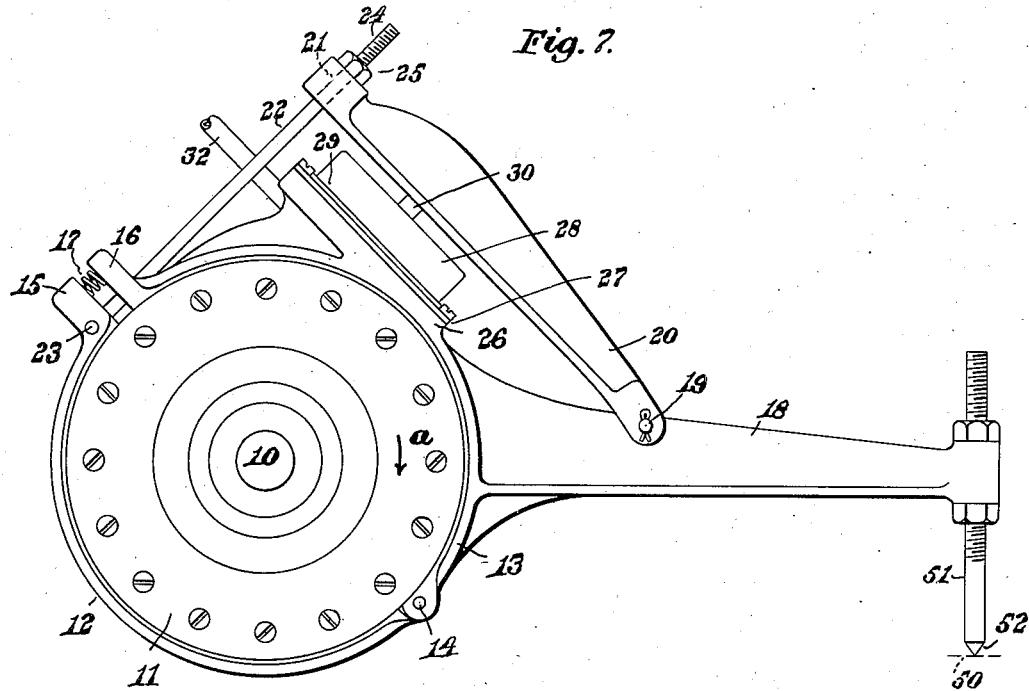
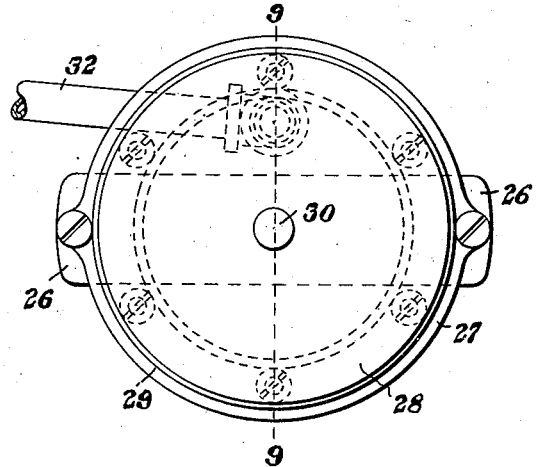
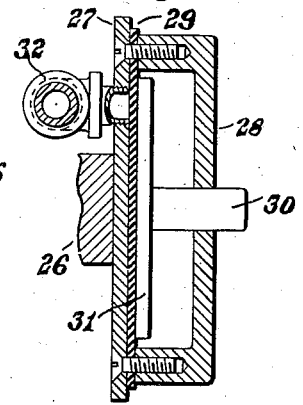
Inventor:
Napoleon S. Bestoso,
by Walter E. Lombard,
Atty.

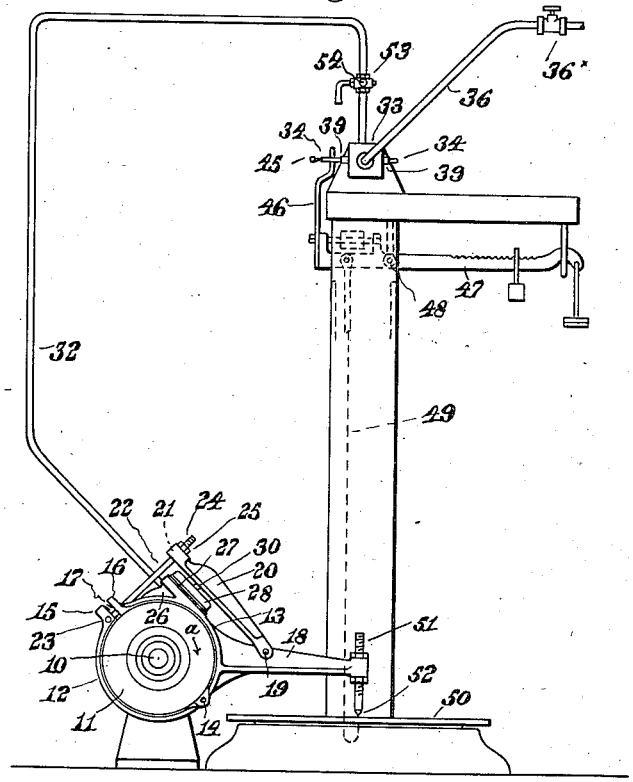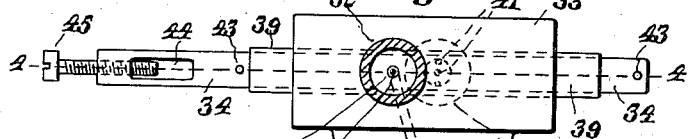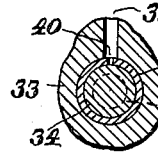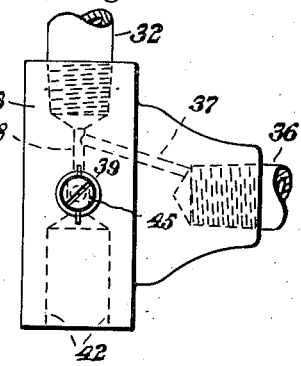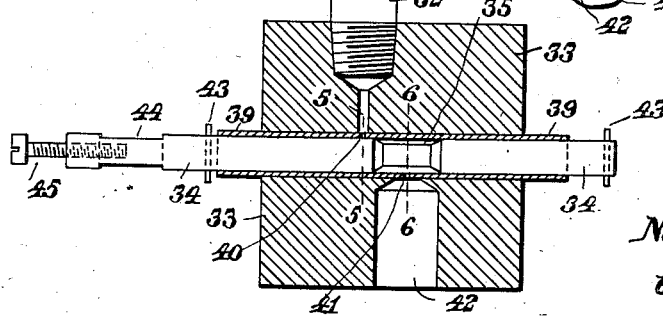

Patented June 2, 1936

2,043,147

UNITED STATES PATENT OFFICE 2,043,147

PRONY BRAKE

Napoleon Santino Bestoso, Holbrook, Mass., assignor to Boston Gear Works, Inc., North Quincy, Mass., a corporation of Massachusetts Application January 10, 1936, Serial No. 58,493

12 Claims. (Cl. 265—24)

This invention relates to Prony brakes adapted for the measurement of the power of a rotating shaft and has for its object the provision of automatic means for controlling any excessive movement of the brake mechanism during the measuring operation.

A further object of the invention is the provision of means whereby the controlling mechanism is actuated by fluid pressure.

A further object of the invention is the provision of friction brake shoes associated with the shaft and controlled by fluid pressure regulated by the movement of the weighing beam of the scale utilized in measuring the power of said shaft.

These objects are attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings

Figure 1 represents a Prony brake embodying the principles of the present invention.

Figure 2 represents a plan of a fluid valve mechanism utilized in carrying out said invention.

Figure 3 represents a side elevation of the same.

Figure 4 represents a horizontal section of the same on line 4, 4, on Fig. 2.

Figure 5 represents a transverse section on line 5, 5 on Fig. 4.

Figure 6 represents a transverse section on line 6, 6 on Fig. 4.

Figure 7 represents an elevation of a revoluble member and brake mechanism associated therewith.

Figure 8 represents an elevation of a dash pot forming part of the brake mechanism, and Figure 9 represents a section of the same on line 9, 9 on Fig. 8.

Similar characters indicate like parts throughout the several figures of the drawings.

In the drawings, 10 is a revoluble shaft having a cylindrical pulley, drum, or disk 11 secured thereto and revoluble therewith in the direction of the arrow $a$ on Figs. 1 and 7.

Surrounding the periphery of the drum or disk 11 are two brake shoes 12 and 13 pivoted at 14 and having at their opposite ends extensions 15 and 16 between which is interposed a spring 17 normally separating said brake shoes 12 and 13.

The brake shoe 13 has extending radially therefrom an arm 18 having pivoted thereto at 19 one end of a bar 20, the opposite end of which has a hole 21 extending therethrough.

Through this hole 21 extends a rod 22, one end of which is pivoted at 23 to the brake shoe 12.

The opposite end is threaded as at 24 and has a stop nut 25 adjustable thereon.

The brake shoe 13 has formed thereon a projection 26 to which is secured a plate 27.

This plate 27 is secured to a dash pot 28 between the open end of which and the plate 27 is interposed a rubber diaphragm 29.

Within the dash pot 28 is a plunger 30 having at one end a flanged head 31 bearing against the inner face of said diaphragm 29.

The opposite end of the plunger 30 extends through a hole in the bottom of the dash pot 28 and bears against the bar 20.

The expansion of the spring 17 will tend to retain said diaphragm 29 and flanged head 31 in contact at all times.

Extending through the plate 27 is a pipe 32 through which fluid may be discharged against the diaphragm 29 causing it to curve inwardly and move the plunger 30 outwardly, thereby forcing the bar 20 about its pivot 19.

This movement of bar 20 will, through the rod 22, draw the brake shoes 12, 13 together and create a friction on the drum or disk 11.

It is obvious that the degree of friction between the drum or disk 11 and brake shoes 12, 13 will depend on the pressure of the fluid passing into the dash pot 28 against the diaphragm 29.

The fluid pipe 32 is connected at its opposite end to a valve casing 33 provided with a reciprocating valve member 34 having intermediate its length a portion 35 reduced in diameter forming an annular space for the passage of the fluid in said casing.

The casing 33 has an inlet pipe 36 connected therewith through which fluid may be admitted to said casing from any suitable source of supply.

This pipe 36 has a valve 36$x$ therein which may be closed to prevent passage of any fluid to the pipe 32.

Fluid admitted to casing 33 from pipe 36 will flow through a passage 37 to a radial passage 38 and then into the pipe 32.

The valve member 34 is surrounded by a tube 39 having an orifice 40 therethrough opposite the inner end of passage 38.

When the valve 34 is in the position shown in Fig. 4 this orifice 40 is closed and fluid from pipe 36 will flow freely into pipe 32.

The tube 39 is also provided with orifices 41 communicating with the outlet 42.

When the valve 34 is moved to the left of Fig. 4 sufficiently to uncover the orifice 40 a part of the fluid in passage 38 will be permitted to pass through the orifices 41 into the outlet 42, thus reducing the fluid pressure in pipe 32.

The valve member 34 is provided with stop pins 43 to limit the movement of said member in either direction by coming into contact with the ends of the tube 39.

The valve member 34 is provided with a transverse slot 44 into which extends a threaded stop member 45.

Into this slot 44 extends a rod 46 secured to one end of a weight beam 47 so that any movement of said beam 47 about its pivot 48 will be transmitted to the valve member 34 and move it endwise.

The beam 47 forms a part of an ordinary weighing scale and is actuated by mechanism 49 connecting the same with the scale platform 50.

As there is nothing new in the weighing scale itself this connecting mechanism 49 is indicated diagrammatically by a dotted line.

The outer end of the arm 18 has adjustably mounted therein a contact member 51, the lower end 52 of which is cone-shaped with its point resting on the platform 50.

In the pipe 32 is a closing valve 53 which may be closed manually to prevent any fluid passing therethrough to the dash pot 28, or may be actuated to permit the discharge of fluid from said pipe 32, thus removing the load on the disk or drum 11.

When it is desired to measure the power of the shaft, weights representing the desired power are placed upon the weight beam 47 and the valve 36x is opened to permit fluid to pass from pipe 36 into passages 37, 38 of valve casing 33 into the pipe 32, the valve 53 being opened to permit the flow of fluid through said pipe 32.

The fluid from the pipe 32 will act against the diaphragm 29 and in so doing by means of plunger 30 move the bar 20 about its pivot to draw the shoes 12, 13 together into frictional engagement with the periphery of the drum or disk 11.

The frictional contact between the shoes 12, 13 and disk or drum 11 will cause the arm 18 to move downwardly with the pointed end 52 of adjustable member 51 in contact with the platform 50 of the weighing scale.

As soon as the platform 50 has moved downwardly more than a sufficient distance to raise the weights on beam 47 to a balanced position, the rod 46 will contact with the screw 45 and move the valve member 34 to the left of Figs. 2 and 4, and in doing so uncover the orifice 40 permitting the fluid to escape from passage 38 into the outlet 42 through the orifices 41.

When the fluid is permitted to escape in this manner there will be less fluid pressure on the diaphragm 29 and the spring 17 will cause the shoes 12, 13 to be moved outwardly free from frictional engagement with the drum or disk 11.

It is obvious that this whole operation will be performed automatically and by means of fluid pressure controlled by the operation of the weighing scale.

As soon as the fluid has been discharged from pipe 32 the weights on beam 47 will immediately return said beam to its balanced position and the movement of valve member 34 will reverse preventing further escape of the fluid.

The valve 53 is an ordinary three-way valve and when it is desired to quickly remove the load on disk or drum 11, it may be operated manually to permit the escape of fluid from pipe 32 through the discharge outlet 54.

When there is no necessity for measuring the power the valve 36x remains closed.

The stop member 45 is adjusted so that there will be free movement of the rod 46 in the slot 44 as it moves upwardly, downwardly or laterally.

It is believed that the operation and many advantages of the invention will be understood readily without further description.

Having thus described my invention, I claim

1. In a Prony brake, a revoluble cylindrical member; brake shoes pivoted together and surrounding the periphery of said revoluble member; a spring for separating said brake shoes; an arm extending outwardly from one of said brake shoes; a bar pivoted at one end to said arm; a connection between the other brake shoe and the outer end of said bar; means for moving said bar about its pivot by fluid pressure; a contact member on the outer end of said arm; a weighing scale upon which the contact member acts; and means for controlling the fluid pressure by the operation of said scale.

2. In a Prony brake, a revoluble cylindrical member; brake shoes pivoted together and surrounding the periphery of said revoluble member; a spring for separating said brake shoes; an arm extending outwardly from one of said brake shoes; a bar pivotally connected at one end to said arm; a connection between the other brake shoe and the opposite end of said bar; a contact member adjustably mounted on the outer end of said arm; a weighing scale upon which said contact member acts; a dash pot on said armed brake shoe; a plunger therein coacting with said bar; a fluid pipe leading to said dash pot; and means actuated by the operation of said weighing scale for controlling the admission of fluid to said dash pot.

3. In a Prony brake, a revoluble cylindrical member; brake shoes pivoted together and surrounding the periphery of said revoluble member; a spring for separating said brake shoes; an arm extending outwardly from one of said brake shoes; a bar pivotally connected at one end to said arm; a connection between the other brake shoe and the opposite end of said bar; a contact member adjustably mounted on the outer end of said arm; a weighing scale upon which said contact member acts; a dash pot on said armed brake shoe; a flanged plunger therein coacting with said bar; a resilient closure for said dash pot in contact with the flanged end of said plunger; a fluid pipe leading to said dash pot; and means actuated by the operation of said weighing scale for controlling the admission of fluid to said dash pot from said pipe.

4. In a Prony brake, a revoluble cylindrical member; brake shoes pivoted together and surrounding the periphery of said revoluble member; a spring for separating said brake shoes; an arm extending outwardly from one of said brake shoes; a bar pivotally connected at one end to said arm; a connection between the other brake shoe and the opposite end of said bar; a contact member adjustably mounted on the outer end of said arm with a lower cone-shaped end; a weighing scale upon which said contact member acts; a dash pot on said armed brake shoe; a plunger therein coacting with said bar; a fluid pipe leading to said dash pot; and means actuated by the operation of said weighing scale for controlling the admission of fluid to said dash pot from said pipe.

5. In a Prony brake, a revoluble cylindrical member; brake shoes surrounding the periphery of said revoluble member and pivoted together; a spring for separating said brake shoes; an arm extending outwardly from one of said brake shoes; a bar pivoted at one end to said arm; a threaded rod pivoted to the other brake shoe and extending through the outer end of said bar; an adjusting nut on the outer end of said rod; a contact member adjustably mounted on the outer end of said arm; a weighing scale provided with a weight beam and on which said contact member acts; a dash pot on said armed member; a plunger therein coacting with said bar; a fluid pipe leading to said dash pot; a slidable valve controlling the passage of fluid to said pipe; and means secured to said weight beam for actuating said valve.

6. In a Prony brake, a revoluble cylindrical member; brake shoes surrounding the periphery of said revoluble member and pivoted together; a spring for separating said brake shoes; an arm extending outwardly from one of said brake shoes; a bar pivoted at one end to said arm; a threaded rod pivoted to the other brake shoe and extending through the outer end of said bar; an adjusting nut on the outer end of said rod; a contact member adjustably mounted on the outer end of said arm; a weighing scale provided with a weight beam and on which said contact member acts; a dash pot on said armed brake shoe; a plunger therein coacting with said bar; a fluid pipe leading to said dash pot; a valve controlling the passage of fluid in said pipe; and means on said weight beam and movable therewith for regulating the operation of said valve.

7. In a Prony brake, a revoluble cylindrical member; brake shoes surrounding the periphery of said revoluble member and pivoted together; a spring for separating said brake shoes; an arm extending outwardly from one of said brake shoes; a bar pivoted at one end to said arm; a threaded rod pivoted to the other brake shoe and extending through the outer end of said bar; an adjusting nut on the outer end of said rod; a contact member adjustably mounted on the outer end of said arm; a weighing scale on which said contact member acts; a dash pot on said armed brake shoe; a plunger therein coacting with said bar; a fluid pipe leading to said dash pot; a valve controlling the passage of fluid to said pipe, and means actuated by the movement of said weighing scale for regulating the operation of said valve.

8. A Prony brake including two brake shoes pivoted together and coacting with the periphery of a revoluble member, one of said brake shoes being provided with a contact member; a weighing scale provided with a weight beam and on which said contact member acts; a fluid controlled device for drawing said brake shoes together; a pipe leading to said device; a valve casing in said pipe; a reciprocating valve member in said casing; and means connected to said weight beam for reciprocating said valve member during the movement of said beam.

9. A Prony brake including two brake shoes pivoted together and coacting with the periphery of a revoluble member, one of said brake shoes being provided with a contact member; a weighing scale provided with a weight beam and on which said contact member acts; a fluid controlled device for drawing said brake shoes together; a pipe leading to said device; a valve casing in said pipe; a reciprocating valve member in said casing provided with a portion of reduced diameter intermediate its ends; a tube in which said valve member moves endwise having an orifice therein communicating with said pipe and other orifices in a different plane communicating with an outlet from said casing; and means connected to said weight beam for reciprocating said valve member during the movement of said beam.

10. A Prony brake including two brake shoes pivoted together and coacting with the periphery of a revoluble member, one of said brake shoes being provided with a contact member; a weighing scale provided with a weight beam and on which said contact member acts; a fluid controlled device for drawing said brake shoes together; a pipe leading to said device; a valve casing in said pipe; a reciprocating valve member in said casing; means connected to said weight beam for reciprocating said valve member during the movement of said beam; and means for limiting the movement of said valve member in either direction.

11. A Prony brake including two brake shoes pivoted together and contacting with the periphery of a revoluble member, one of said brake shoes being provided with a contact member; a weighing scale provided with a weight beam and on which said contact member acts; a fluid controlled device for drawing said brake shoes together; a pipe leading to said device; a valve casing in said pipe; a reciprocating valve member in said casing having an elongated slot therein; an adjustable stop member extending into one end of said slot; and a rod connected to said beam projecting through said slot and adapted to reciprocate said valve member during the movement of said beam.

12. A Prony brake including two brake shoes pivoted together and coacting with the periphery of a revoluble member, one of said brake shoes being provided with a contact member; a weighing scale provided with a weight beam and on which said contact member acts; a fluid controlled device for drawing said brake shoes together; a pipe leading to said device; a valve casing in said pipe; a reciprocating valve member in said casing; means connected to said weight beam for reciprocating said valve member during the movement of said beam; and a manually actuated valve in said pipe for stopping the flow of fluid therethrough.

NAPOLEON SANTINO BESTOSO.